US009380610B2

(12) United States Patent
Yerrabommanahalli et al.

(10) Patent No.: US 9,380,610 B2
(45) Date of Patent: Jun. 28, 2016

(54) SYSTEM AND METHOD FOR PERFORMING EMERGENCY CALLS OVER WIFI WHEN A CELLULAR NETWORK IS UNAVAILABLE

(71) Applicant: APPLE INC., Cupertino, CA (US)

(72) Inventors: Vikram B. Yerrabommanahalli, Cupertino, CA (US); Cesar Perez, Cupertino, CA (US); Teck Yang Lee, Cupertino, CA (US)

(73) Assignee: APPLE INC., Curpertino, CA (US)

( * ) Notice: Subject to any disclaimer, the term of this patent is extended or adjusted under 35 U.S.C. 154(b) by 0 days.

(21) Appl. No.: 14/501,996

(22) Filed: Sep. 30, 2014

(65) Prior Publication Data

US 2015/0245388 A1 Aug. 27, 2015

Related U.S. Application Data

(60) Provisional application No. 61/943,761, filed on Feb. 24, 2014, provisional application No. 62/003,977, filed on May 28, 2014, provisional application No. 62/005,916, filed on May 30, 2014.

(51) Int. Cl.
*H04M 11/04* (2006.01)
*H04W 76/00* (2009.01)
*H04L 29/06* (2006.01)

(52) U.S. Cl.
CPC ......... *H04W 76/007* (2013.01); *H04L 65/1016* (2013.01); *H04L 65/1073* (2013.01)

(58) Field of Classification Search
CPC ............ H04W 76/007; H04L 65/1073; H04L 65/1016
See application file for complete search history.

(56) References Cited

U.S. PATENT DOCUMENTS

| 5,937,344 | A | * | 8/1999 | Zicker | H04W 4/22 455/404.1 |
| 2007/0060097 | A1 | * | 3/2007 | Edge | H04L 65/007 455/404.1 |

* cited by examiner

*Primary Examiner* — Martin Mushambo
(74) *Attorney, Agent, or Firm* — Fay Kaplun & Marcin, LLP

(57) ABSTRACT

A station that performs methods related to emergency calls. In one example, the station determines that a first connection to a cellular network is unavailable, the client station being associated with a home network having a home Public-Safety Answering Point (PSAP), the station disposed at a location outside the home network, the location having a remote PSAP. The station determines a second connection to a WiFi network is available, establishes the second connection to the WiFi network and performs an emergency call over the WiFi network. The emergency call being routed to the remote PSAP associated with the location. In another example, the station determines it is capable of performing an emergency call over a cellular network, receives a request to perform an emergency call, determines whether a circuit switched radio access technology (CS-RAT) is available and performs the emergency call over a WiFi network when the CS-RAT is unavailable.

20 Claims, 5 Drawing Sheets

SYSTEM AND METHOD FOR PERFORMING EMERGENCY CALLS OVER WIFI WHEN A CELLULAR NETWORK IS UNAVAILABLE

INCORPORATION BY REFERENCE/PRIORITY CLAIM

This application claims priority to U.S. Provisional Application Ser. No. 61/943,761 entitled "System and Method for Performing Emergency Calls Over WiFi," filed on Feb. 24, 2014, U.S. Provisional Application Ser. No. 62/003,977 entitled "System and Method for Performing Emergency Calls Over WiFi," filed on May 28, 2014 and U.S. Provisional Application Ser. No. 62/005,916 entitled "System and Method for Performing Emergency Calls Over WiFi," filed on May 30, 2014. Each of the above-identified applications are incorporated herein, in their entirety, by reference.

BACKGROUND

A client station may be configured to connect to a variety of different wireless networks based on the hardware and software configurations thereof. For example, a client station may be able to connect to a cellular network and/or a WiFi network, depending on how the client station is configured. While connected to a wireless network, the client station may execute a call application via which a voice call may be performed. A specific implementation of the voice call is an emergency call in which the call is routed to a Public-Safety Answering Point (PSAP).

DETAILED DESCRIPTION

Figure 1:
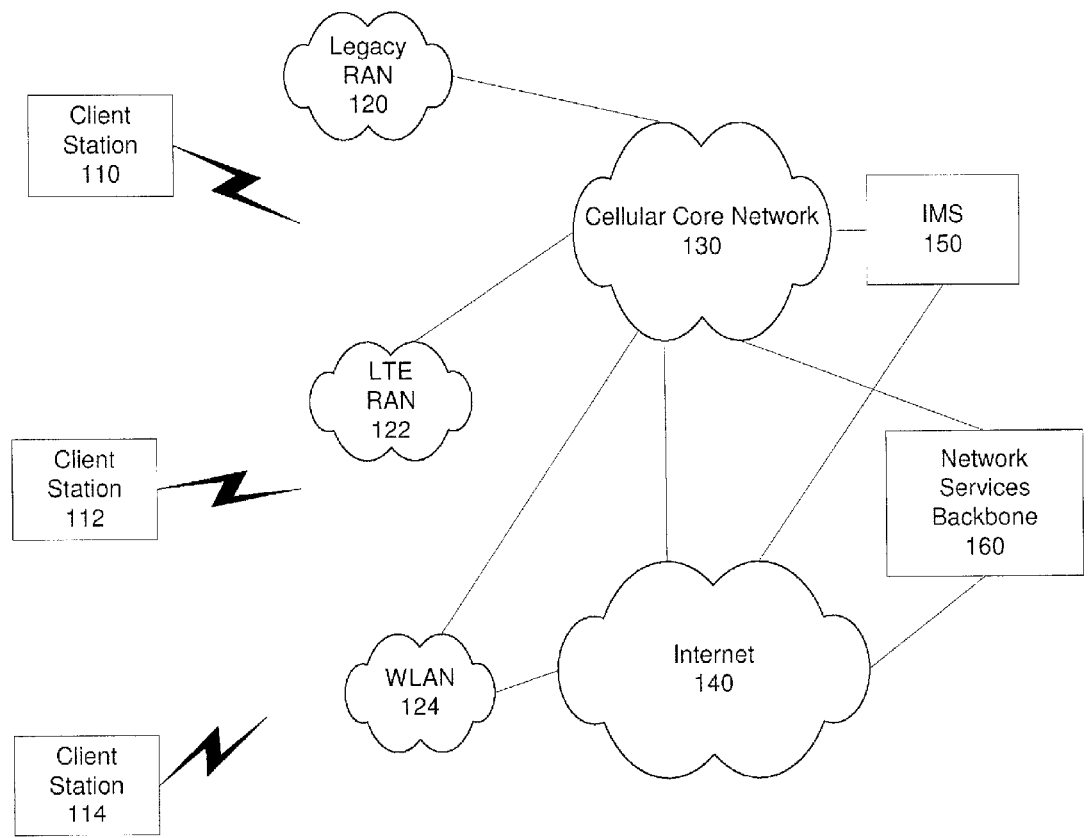
FIG. 1 shows an exemplary network arrangement.

The exemplary embodiments may be further understood with reference to the following description and the related appended drawings, wherein like elements are provided with the same reference numerals. The exemplary embodiments are related to a system and method for performing an emergency call with a client station. Specifically, the client station may be able to perform a voice call using either a cellular network or an Internet Protocol (IP) network. The term "cellular network" refers to any type of radio access network ("RAN") having distributed cells for communicating with client stations. In one example, a cellular network may include networks utilizing legacy circuit-switched (CS) or packet-switched (PS) communications such as a 2G radio access network (RAN) or a 3G RAN. In another example, a cellular network may also include networks utilizing next generation technology such as a Long Term Evolution Radio Access Network (LTE-RAN). The IP network may represent networks that are IP-only such as a WiFi network (e.g., as defined by IEEE 802.11a/b/g/n/ac). While connected to the WiFi network, the client station may specifically be configured to perform an emergency call. The exemplary embodiments provide a mechanism for an emergency call placed over the WiFi network to be properly routed to a nearest PSAP relative to the client station rather than a home PSAP associated with the client station.

FIG. 1 shows an exemplary network arrangement 100. The exemplary network arrangement 100 includes client stations 110-114. In this example, it is assumed that the client stations 100-114 are associated with a single user. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from client stations that are equipped with the appropriate cellular chip set. Examples of the legacy RAN may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes an HSS server that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

However, as described above, not every client station 110-114 may have the same communication capabilities with the networks 120, 122, 124, 130, 140. This lack of communication with one or more of the networks may be due to the capabilities of the client device 110-114, e.g., the client device does not include a cellular chip, or may be due to a limitation of the network, e.g., a cellular network does not have a base client station within range of the client station. This lack of communication with one or more networks may result in the client station being unable to avail itself of the functionalities that are available via one or more of the networks.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. These extensions may include the functionalities to which the client device 110-114 does not have access because of limitations of the device and/or network, some examples of which were described above. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114.

The exemplary embodiments described herein provide an example of different types of functionalities that may be extended to a client station 110-114 and also provide an example of components and services that may be included in the network services backbone 160. In this example, the network services backbone 160 is used to provide emergency calls over WLAN networks by the client stations 110-114]. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

A client station (e.g., client stations 110-114) may be able to connect to a legacy RAN and/or or a WiFi network, depending on its capabilities. For example, the client station may include wireless communications circuitry that is capable of communicating with the legacy RAN. More specifically, the legacy RAN may be for a particular cellular service provider. The wireless communications circuitry may include any component or combination of components to perform communications via the legacy RAN. In another example, the client station may include wireless communications circuitry for communications with a WiFi network. In various embodiments, a client station may include wireless communications circuitry for communicating (a) only with legacy RANs, (b) only with WiFi networks, or (c) for communicating with both legacy RANs and WiFi networks. Further details regarding wireless communications circuitry that may be included in a client station are provided below with reference to FIG. 3.

While the client station is connected to the legacy RAN 120, the client station may execute a call application to establish a voice call with a target user over the legacy RAN 120. While the client station is connected to the LTE-RAN 122 or the WLAN 124, the client station may execute a variety of different applications to exchange data with other electronic devices. In a specific example of communicating with other electronic devices, the client station may be configured to also perform the voice call over the WLAN 124. In view of the manner in which the voice call is performed over the WLAN 124, the voice may be transmitted using, for example, the IMS 150 when the client station uses the WLAN 124. An exemplary manner of performing the voice call over the WLAN 124 is the call application performing a Voice over Internet Protocol (VoIP) call. More specifically, the VoIP call may be a Voice over Long Term Evolution (VoLTE) call.

Throughout this description, it will be described that the IMS 150 is used for a voice call to be performed over the LTE-RAN 122 or WLAN 124. However, those skilled in the art will understand that the use of the IMS 150 is only exemplary and that any network functionality that enables a station to perform a voice call over the LTE-RAN 122 or WLAN 124 may be used. For example, the IMS 150 may enable this functionality by being an interface between the LTE-RAN 122 or WLAN 124 (more specifically the cellular core network 130) and other networks (such as a public switched telephony network (PSTN)) for the voice call to be performed by the client station and a target destination. Therefore, the IMS 150 may represent any network functionality that provides this interface.

A specific type of voice call that may be performed over the legacy RAN 120, the LTE-RAN 122, or the WLAN 124 is an emergency call. In many countries, the public telephone network has a single emergency telephone number (e.g., "911" in North America, "112" in European countries, etc.) that allows a caller to contact emergency services for assistance. Thus, when the caller inputs the emergency telephone number into the call application of the client station, the voice call may be routed to a PSAP. The PSAP is a call center responsible for answering calls to an emergency telephone number for police, firefighting, ambulance services, and other emergency services. Therefore, there are a plurality of PSAPs disposed in select geographic locations that handle the emergency calls that are performed within the respective geographic area assigned to the PSAPs.

When a landline is used to perform an emergency call, a location of the stationary telephone is known. Specifically, the use of the PSTN with the related service provider may indicate the location that the emergency call is originating. When the location is known, the emergency call may be routed to a local PSAP relative to the caller.

With a client station that is mobile, the location of the user may change. When a client station registers with a home network, the client station may be associated with the region of the home network (e.g., the assumption being the client station is disposed in the region of the home network a majority of the time it is used). When the client station is configured to use the legacy RAN 120 or the LTE-RAN 122 to perform the voice call using the call application, the location of the client station may be known by the respective base station that the client station has associated to connect to the respective network. Thus, an emergency call performed by the client station may be properly routed to the local PSAP. For example, when the client station is in the region of the home network, the connection to the legacy RAN 120 provides the location of the client station such that an emergency call is routed to the local PSAP responsible for the region of the home network. In another example, when the client station is in a remote region away from the home network, the connection to the legacy RAN 120 or the LTE-RAN 122 still provides the location of the client station such that an emergency call is routed to the local PSAP responsible for this remote region.

As discussed above, the call application may be performed by the client station using the WLAN 124 as well. However, unlike the legacy RAN 120 and the LTE-RAN 122, a connection to the WLAN 124 does not include a location of the client station. When using the call application for a non-emergency voice call with a target destination, the location information may be irrelevant. In contrast, the location of the client station may be highly relevant when performing the emergency call. Specifically, the location may indicate a manner in which the emergency call is to be routed to a desired PSAP. Using the WLAN 124 and without a known location of the client station, the emergency call may be handled in a sub-optimal manner. Specifically, the client station may be associated with a home network. The emergency call may always be routed to the PSAP responsible for the region of the home network. When the client station is in this region, the routing to this PSAP may be preferred. However, again, due to its mobile nature, the client station may not be in this region but in a remote region. Nevertheless, the emergency call is still routed to the PSAP responsible for the region of the home network. This may cause undue delay or other complications in handling the emergency.

The exemplary embodiments provide a manner of routing emergency calls performed over the WLAN 124 to the local PSAP relative to the location of the client station. Specifically, the emergency call may be performed when connected to the WLAN 124 by registering with an IMS 150 in the location of the client station. By including this location information when registering with the IMS 150, the emergency call may be routed to the local PSAP rather than a home PSAP which may not be the optimal PSAP to handle the emergency call. In this manner, though using the WLAN 124 to perform the emergency call, the local PSAP may still receive the emergency call rather than the PSAP of the home network. The exemplary embodiments also provide a default mechanism for the standard location-free emergency call to be performed but also include a modification for the location to be used if available.

Figure 2:
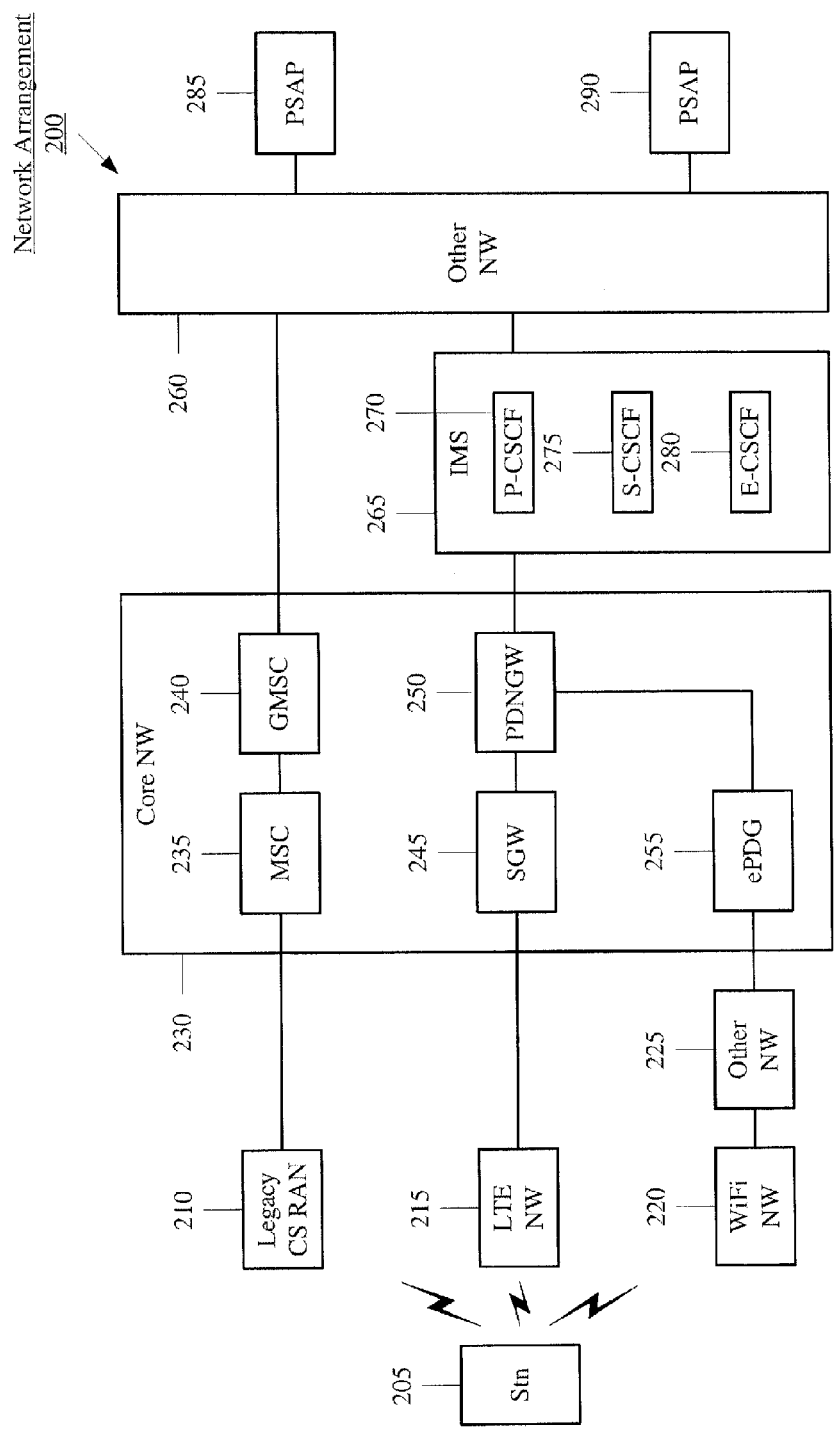
FIG. 2 shows an exemplary network arrangement in more detail than FIG. 1 that is used to perform an emergency call.

FIG. 2 shows an exemplary network arrangement 200 in more detail than the network arrangement 100 of FIG. 1 that is used to perform an emergency call. The network arrangement 200 may represent a variety of different pathways for an emergency call to be routed to reach a PSAP. The pathway may depend upon a network type being utilized to perform the emergency call. The pathway may also depend upon location information of the client station performing the emergency call. As illustrated in FIG. 2, a client station 205 may utilize a legacy RAN 210, a LTE-RAN 215, or a WiFi network 220. The client station 205 may be any of the client stations 110-114 illustrated in FIG. 1.

As discussed above, the legacy RAN 210 may be any cellular network that operates in defined cellular frequency bands and managed by a cellular service provider. For example, the legacy RAN 210 may be a 2G RAN or a 3G RAN. Thus, the client station 205 may connect to the legacy RAN 210 via a cellular base station. The LTE-RAN 215 may also be a cellular network that utilizes an IP-based network that operates in defined cellular frequency bands and may also be managed by the cellular service provider. Thus, the client station 205 may connect to the LTE-RAN 215 via an evolved Node B (eNB). The WiFi network 220 may be any WiFi network that operates in defined WiFi frequency bands and managed by WiFi servers that may include public WiFi servers (e.g., HotSpots provided by cellular service providers) or private servers (e.g., a personal home access point, router, etc.). Thus, when further servers are included, the WiFi network 220 may be connected to other networks 225 such as an Internet Service Provider (ISP). As described above, a WiFi network is a type of WLAN 124. Thus, throughout this description, the term WiFi network should be understood to include any type of WLAN.

Each of the legacy RAN 210, the LTE-RAN 215, and the WiFi network 220 (as well as the other networks 225) may be connected to a respective cellular core network 230 as also shown in FIG. 1. As shown in FIG. 2, the cellular core network 230 is illustrated as a single unit that includes a variety of different components that handles data transmissions with the various different types of networks. However, it should be noted that such a configuration is only exemplary and is used for illustrative purposes only. Specifically, the cellular core network 230 may be separated to include corresponding components for each type of network. As shown in FIG. 2, the cellular core network 230 may include a mobile switching center (MSC) 235 and a gateway MSC 240 for the legacy RAN 210; a serving gateway (SGW) 245 and a packet data network gateway (PDNGW) 250 for the LTE-RAN 215; and an evolved packet data gateway (ePDG) 255 and the PDNGW 250 for the WiFi network 220.

With the legacy RAN 210, the cellular core network 230 may include components for, for example, a Global System for Mobile Communications (GSM) core network or a Code Division Multiple Access (CDMA) core network. The MSC 235 may be responsible for routing voice calls, SMS, conference calls, fax, circuit switched data, etc. in GSM/CDMA cellular networks. Other functions such as set up and release of the end-to-end connections, mobility and call hand-overs, and account monitoring may be handled by the MSC 235. Those skilled in the art will understand that the MSC 235 may have different functionalities that may be performed by the same MSC or may include further components to perform these further functionalities. Specifically, the GMSC 240 may be the MSC that determines which visited MSC the subscriber who is being called is currently located. The GMSC 240 also interfaces with the PSTN (as will be described below). All mobile to mobile calls and PSTN to mobile calls are routed through the GMSC 240 when using the legacy RAN 210.

With the LTE-RAN 210, the cellular core network 230 may include, for example, components for an Evolved Packet Core (EPC) or a System Architecture Evolution (SAE) Core providing an all-IP architecture. The SGW 245 is a packet based server that routes data packets. The SGW 245 also is a mobility anchor for inter-eNB handovers and for mobility between LTE and other 3GPP technologies (e.g., terminating S4 interface and relaying the traffic between 2G/3G systems and the PDNGW 250). The PDNGW 250 provides connectivity from the client station 205 to external packet data networks by being the point of exit and entry of traffic for the client station 205. Examples of functionalities performed by the PDNGW 250 include policy enforcement, packet filtering, billing support, lawful interception and packet screening. The PDNGW 250 may also anchor mobility between 3GPP and non-3GPP technologies such as WiMAX and 3GPP2 (CDMA 1X and EvDO). Accordingly, the PDNGW 250 may be configured to interface with an IMS 265 (as will be described below).

The cellular core network 230 may also include, for example, an ePDG 255, which may be used when the client station 205 communicates data to/from the cellular core network 230 via the WiFi network 220. The ePDG 255 secures the data transmission with the client station 205 connected to the cellular core network 230 over an untrusted non-3GPP access such as the WiFi network 220. The ePDG 255 may act as a termination node when an IPsec tunnel is established between the cellular core network 230 and the client station 205. The ePDG 255 may also be connected to the PDNGW 250.

As discussed above, the GMSC 240 may interface with the PSTN. The PSTN may be part of other networks 260 which is constructively shown in FIG. 2 as being between the cellular core network 230 and PSAPs 285, 290 for the legacy RAN 210. For example, the PSTN may be used as one of the other networks 260 to determine a manner of routing the emergency call to the target PSAP 285, 290. The cellular core network 230 for the LTE-RAN 215 and the WiFi network 220 may also interface with the other networks 260. However, in view of the manner in which the voice call is performed over these IP-based architectures, an IMS 265 may be utilized. Specifically, the PDNGW 250 may interface with the IMS 265, which interfaces with the other networks 260.

The IMS 265 provides an architectural framework for delivering IP multimedia services such as a VoIP call, a VoLTE call, etc. performed over the LTE-RAN 215 or the WiFi network 220. The IMS 265 may provide this interface between the cellular core network 230 and the other networks 260 using a call session control function (CSCF). The CSCF provides signaling that controls the communication of the client station 205 with the IMS 265. The CSCF may control session establishment and teardown, user authentication, network security and QoS (Quality of Service). The IMS 265 may include a plurality of different CSCFs. As shown in FIG. 2, the IMS 265 may include a proxy-CSCF (P-CSCF) 270, a serving-CSCF (S-CSCF) 275, and an emergency-CSCF (E-CSCF) 280. Those skilled in the art will also understand that the IMS 265 may further include an interrogating-CSCF (I-CSCF).

The P-CSCF 270 may be an interface between the client station 205 and the IMS 265. Specifically, the P-CSCF 270 may act as a session initiation protocol (SIP) proxy and may be located in either the user's home network or in the visited network for handling roaming. Thus, all SIP requests and responses from/to the client station 205 traverse the P-CSCF 270. The P-CSCF 270 supports various functionalities such as validating the correctness of SIP messages with the client station 205 according to SIP standard rules; ensuring the security of the messages between client station 205 and the IMS 265 using IPsec or TLS security associations; authenticating and asserting the identity of the client station 205; compressing the messages ensuring the efficient transmission of SIP messages over narrowband channels; etc. The P-CSCF 270 may support policy enforcement capabilities for authorizing media plane resources, bandwidth, and QoS management. In addition, the P-CSCF 270 may also generate billing information to be collected by charging network nodes.

The S-CSCF 275 may act as a SIP registrar and/or a SIP redirect server. The S-CSCF 275 may be responsible for processing the location registration of the client station 205, user authentication, and call routing and processing. As will be described in further detail below, the location registration may be utilized in accordance with the exemplary embodiments. All of the SIP signaling from/to the client station 105 traverses their serving S-CSCF 275 allocated during the registration process. The S-CSCF 275 may also provide SIP message routing and services triggering as well as enforcing the policy of the network operator to keep users from performing unauthorized operations. Those skilled in the art will understand that the S-CSCF may be located in the home network. However, a number of S-CSCFs 275 may be deployed for scalability and redundancy.

The E-CSCF 280 may be responsible for handling emergency call services. Once the P-CSCF 275 detects that the received SIP message request is for an emergency call, the SIP message for the emergency call may be forwarded to the E-CSCF 280 by the P-CSCF 275. The E-CSCF 280 may then contact the Locating Retrieval Function (LRF) to determine the location of the client station 205 for routing the emergency call appropriately. The E-CSCF 280 may be located either in a home network or in a visited network. As will be described in further detail below, when the emergency call is performed using the WiFi network, the location information used to register with the IMS 265 may be utilized by the E-CSCF 280 for the routing.

It should be noted that the above mechanism of using the functionalities of the IMS 265 is only exemplary. Those skilled in the art will understand that the manner in which the different functionalities are used are dependent upon configurations and settings of the IMS 265. For example, the use of the E-CSCF 280 by the P-CSCF 270 may be optional.

Once the IMS 265 provides its functionalities for the emergency call performed over the LTE-RAN 215 or the WiFi network 220 from the client station 205, the emergency call may be routed based upon the information determined by the IMS 265 using the other networks 260 such as the PSTN. Subsequently, the routing may provide a communications connection between the client station 205 and the PSAP 285 or the PSAP 290. Again, this may depend upon the location information that is used to register with the IMS 265.

As discussed above, the PSAP 285 and the PSAP 290 may each be a call center that handles emergency calls that are routed thereto. For illustrative purposes, the PSAP 285 is described as a home PSAP while the PSAP 290 is described as a remote PSAP. The terms "home" and "remote" may be used with regard to a home network of the client station 205. Thus, the home network of the client station 205 may be an area in which the home PSAP 285 is a local PSAP. In a similar manner, the remote network of the client station 205 may be an area in which the remote PSAP 290 is a local PSAP. Thus, as discussed above, when the client station 205 is located in the area of the home network, a preferred PSAP for an emergency call to be routed is the home PSAP 285. When the client station 205 is located in the area of the remote network a preferred PSAP for an emergency call to be routed is the remote PSAP 290.

As described above, devices in the network arrangement 200 may be configured to communicate with the PSAPs 285, 290 by executing a call application to perform an emergency call over the legacy RAN 210, the LTE-RAN 215, or the WiFi network 220. As related to the exemplary embodiments, the emergency call may be performed over the WiFi network 220 by registering with the IMS 265. According to the exemplary embodiments, based upon the location information used to register with the IMS 265, the emergency call may be routed to the PSAP 285 or the PSAP 290. Therefore, the client station 205 may include the required hardware and software components to provide the required data and information.

Figure 3:
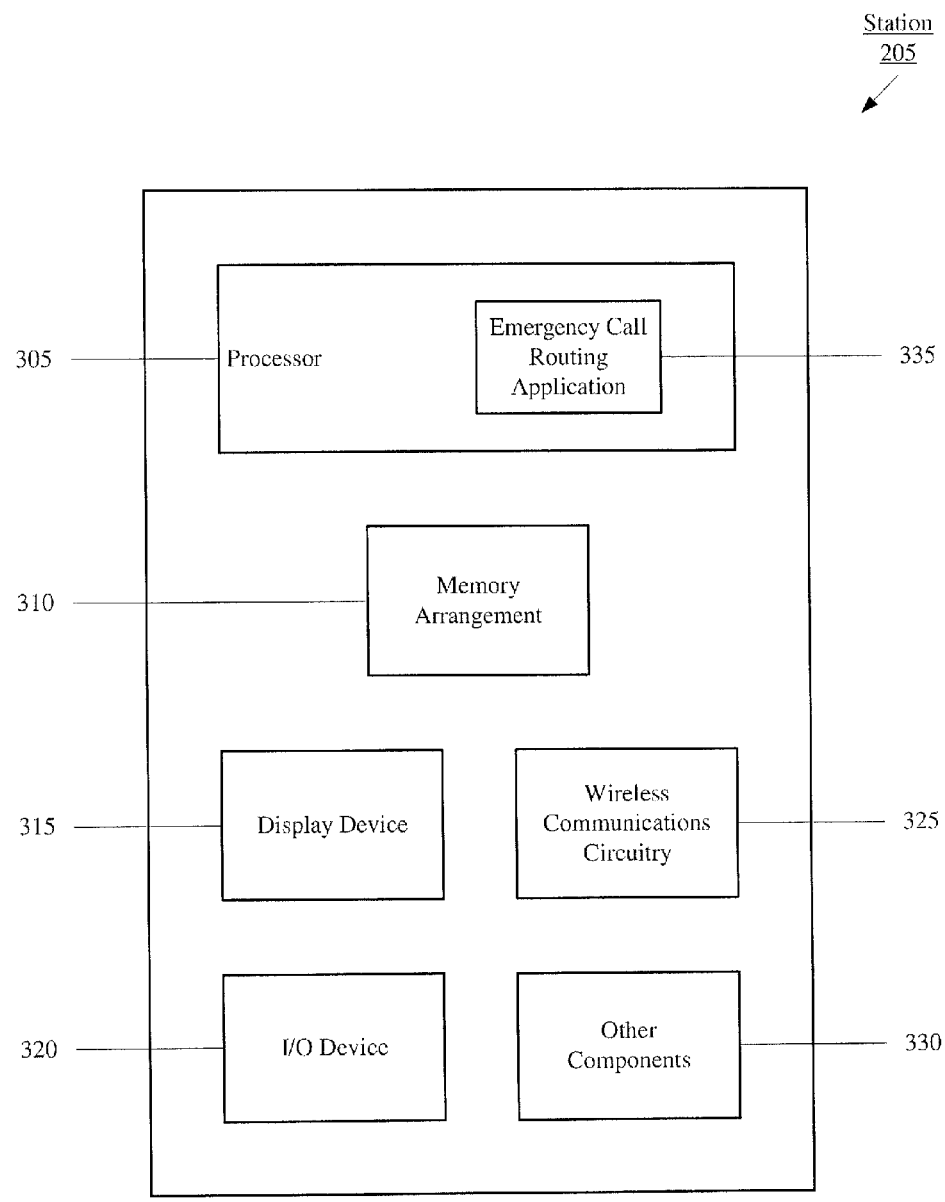
FIG. 3 shows an exemplary client station configured to perform the emergency call.

FIG. 3 shows an exemplary client station 205 configured to perform the emergency call. Specifically, the client station 205 may represent any portable device configured to perform an emergency call over the legacy RAN 210, the LTE-RAN 215, the WiFi network 220, or any combination thereof. Thus, the client station 205 may be a cellular phone, a smartphone, a tablet, a phablet, a laptop, etc. The client station 205 may include a processor 305, a memory arrangement 310, a display device 315, an input/output (I/O) device 320, wireless communications circuitry 325, and other components 330.

The processor 305 may be configured to execute a plurality of applications of the client station 205. For example, the applications may include a call application to perform a voice call with a further client station. Specifically, the voice call may be a specialized one such as an emergency call. In another example, the applications may include an emergency call routing application 335 that determines a manner in which the emergency call is to be performed dependent upon how the emergency call is to be routed. More particularly and as will be described in further detail below, the emergency call routing application 335 may provide location information while registering with the IMS 265 when performing the emergency call over the WiFi network 220. Specifically, when the client station 205 is located in the area of the remote network, the emergency call may be routed to the local PSAP 290 instead of the home PSAP 285 by providing the location information. It should be noted that the call application and the emergency application 335 being a program executed by the processor 305 is only exemplary. The applications may also be represented as a separate incorporated component of the client station 205 or may be a modular component coupled to the client station 205.

The memory arrangement 310 may be a hardware component configured to store data related to operations performed by the client station 205. For example, the memory arrangement 310 may store the location information of the client station 205 to be used by the emergency call routing application 335. The display device 315 may be a hardware component configured to show data to a user while I/O device 320 may be a hardware component configured to receive inputs from the user and output corresponding data. Specifically, the I/O device 320 may provide a numeric keypad in which an emergency telephone number may be entered to perform the emergency call. The other components 335 may include a portable power supply (e.g., battery), a data acquisition device, ports to electrically connect the client station 205 to other electronic devices, an audio I/O device, etc.

The wireless communications circuitry 325 may be one or more integrated circuits and/or other hardware components configured to transmit and/or receive data with the cellular network and/or the WiFi network. As described above, the client station 205 may be configured to connect to the legacy RAN 210, the LTE-RAN 215, the WiFi network 220, or any combination thereof. Thus, the wireless communications circuitry 325 may includes components (such as one or more baseband processors, digital signal processing (DSP) circuits, transceivers, radio frequency (RF) front ends, and/or other components) that are configured for communication via the legacy RAN 210, the LTE-RAN 215, and/or the WiFi network 220. In various embodiments, the wireless communications circuitry 325 may include components for communicating (a) only with cellular networks, (b) only with WiFi networks, or (c) for communicating with both cellular and WiFi networks. Although not shown in FIG. 3, the client station 205 may include one or more antennas, and the wireless communications circuitry 325 may be coupled to the one or more antennas. Whenever it is described herein that the client station 205 communicates data to/from a wireless network, that communication may be performed using the one or more antennas.

According to the exemplary embodiments, the emergency call routing application 335 may perform a P-emergency-calling-routable (PECR) functionality. The purpose of the packet header P is to convey to an IMS client of the client station 205 if a geolocation (e.g., latitude and longitude combination) provided during a registration procedure to the IMS is routable to a local PSAP. As discussed above, this may be performed by the IMS 265 when the packets are received thereby using the E-CSCF 280. Again, when connected to the WiFi network 220 and performing the emergency call, the client station 205 may register with the IMS 265 since the IMS 265 provides the architectural framework for delivering IP multimedia services which include packet switching for, for example, an emergency call performed over the WiFi network 220. It should be noted that the use of the P-header as well as the PECR functionality may be toggled to be enabled/disabled via settings in a carrier bundle and may also depend on whether a service provider, a carrier, and/or a country supports such a feature.

The IMS client may determine the location of the client station 205 using a variety of manners. For example, an out-of-band crowd-sourced WiFi location lookup may be used when associating with the WiFi base station for the first time, for every new WiFi base station, or service set identification (SSID). In another example, a global positioning system (GPS), a satellite based system, a triangulation system, etc. may be used to determine the location. The location may be stored in the memory arrangement 310 by the IMS client as a list against each WiFi base station for future use. Thus, when a subsequent connection is with a previously associated WiFi base station, the memory arrangement 310 may have the location information already stored. It should be noted that the list may be updated if the location information changes or a timer related to storing the information expires. For example, after a predetermined number of connections to a particular WiFi base station, the IMS client may perform the location determining functionality. In another example, after a predetermined time from a first determining of the corresponding location information, the IMS client may perform the location determining functionality.

According to the exemplary embodiments, when the IMS client has location information available, the IMS client may include the location information in the P-header during a registration procedure with the IMS (when performing an emergency call). The IMS client may include the location information in, for example, a presence information data format (PIDF)-location object (LO) in accordance with RFC 4119 which defines a LO format. The LO may be included in a message body with content type application/PIDF+XML, and include a content identification universal resource locator (URL) that refers to the message body as the geolocation header field value in the P-header in accordance with RFC 6442 which defines location conveyance for a SIP procedure such as that used in registering with the IMS 265.

It should be noted that for devices with no cellular baseband (e.g., a WiFi only capable device), the location obtained, for example, via the out-of-band crowd-sourced WiFi location lookup may be used to determine the location of a closest cell site per Radio Access Technology (RAT) for a given carrier of interest. This lookup may be done either by the IMS client or the carrier network. Depending on the distance between the IMS client location and location of the closest cell site, the cell site information (e.g., syntax as defined by RFC 3455) may be used by the IMS client to comply with P-Access-Network Information (PANI).

As will be described in further detail below, the exemplary embodiments provide a mechanism to perform an emergency call such that location information may be utilized more often such that a local PSAP may have the emergency call routed thereto, even when the emergency call is performed over a WiFi network. The exemplary embodiments may determine the capabilities of the client station performing the emergency call as well as the configurations to determine the manner of performing the emergency call (e.g., over the legacy RAN 210, over the LTE-RAN 215, or over the WiFi network 220). When performed over the WiFi network 220, the exemplary embodiments provide a manner of further including location information such that the local PSAP has the emergency call routed thereto or, as a fallback option, a standard routing to a home PSAP may be performed.

Specifically, when the emergency call is performed over the legacy RAN 210 or the LTE-RAN 215, the emergency call may be routed to the home PSAP 285 when the client station 205 is located in the area of the home network or may be routed to the remote PSAP 290 when the client station 205 is located in the area of the remote network. Again, when using the LTE-RAN 215, the emergency call may also be routed through the IMS 265. Using location information already known by the networks, the appropriate routing may be performed. When the client station 205 is connected to the WiFi network 220 and an emergency call is performed over the WiFi network 220, location information (when known) may be provided when registering with the IMS 265. Thus, using location information known by the networks, the appropriate routing may be performed. However, when the location information is not known, the emergency call may use the fallback option of always being routed to the home PSAP 285 regardless of the location of the client station 205.

Figure 4:
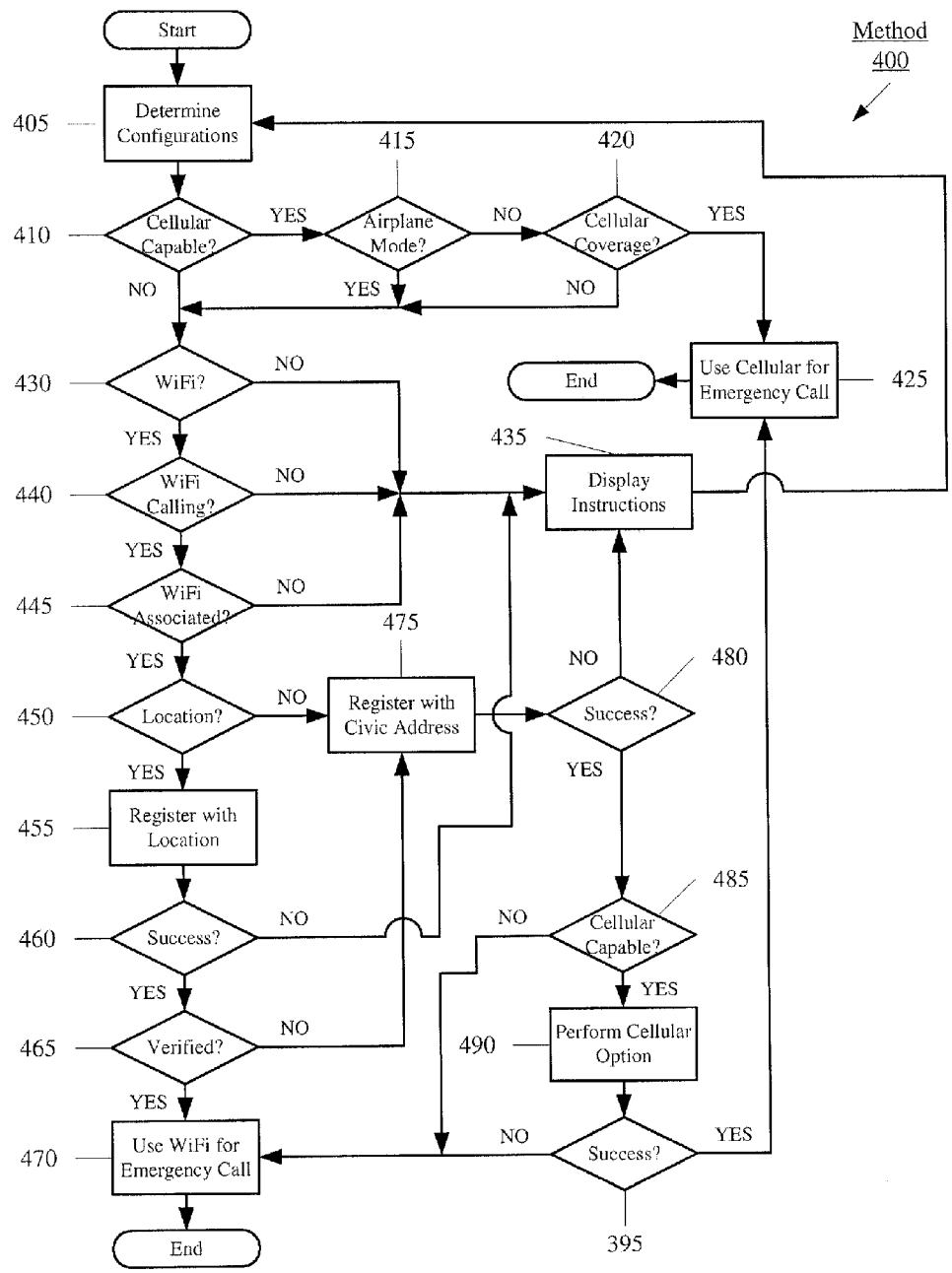
FIG. 4 shows an exemplary method for performing the emergency call.

FIG. 4 shows an exemplary method 400 for performing the emergency call by the client station 205. In the method 400 of FIG. 4, the client station 205 determines whether an emergency call is to be performed over the WiFi network 220 or the legacy RAN 210. For illustrative purposes and as discussed above, the LTE-RAN 215 may also be represented by the legacy RAN 210. Thus, the description of the method 400 describing the legacy RAN 210 may also incorporate the LTE-RAN 215. The method 300 further includes the client station 205 determining whether the emergency call performed over the WiFi network 220 utilizes location information for a local PSAP to have the emergency call routed thereto. The method 400 will be described with regard to the network arrangement of FIG. 2 and the components of the client station 205 of FIG. 3.

In step 405, the emergency call routing application 335 determines the configurations of the client station 205. For example, the configurations may relate to a WiFi capability, a cellular capability, other configurations that are enabled/disabled, etc. The configurations of the client station 205 may affect the manner in which the emergency call is to be performed. Thus, in step 410, the emergency call routing application 335 determines whether the client station 205 is cellular capable. That is, the wireless communications circuitry 325 is configured to communicate with the legacy RAN 210.

If the client station 205 is cellular capable, the emergency call routing application 335 continues the method 400 to step 415. For example, as shown in FIG. 1, the client station 205 may be configured to connect to the legacy RAN 210 via a cellular base station. In step 415, the emergency call routing application 235 determines whether the cellular capability has been disabled. For example, the cellular capability may be manually disabled by the user of the client station 205 by enabling an airplane mode. If the airplane mode is enabled, the emergency call routing application 335 continues the method 400 to step 430 that will be discussed below. However, if the airplane mode is disabled, the emergency call routing application 335 continues the method 400 to step 420.

In step 420, the emergency call routing application 335 determines whether the enabled cellular capability has a cellular coverage associated therewith. For example, the client station 205 may be disposed in a geographic location where an operating area of the legacy RAN 210 does not extend. Therefore, although the cellular capability is enabled, the legacy RAN 210 is not accessible and there is no cellular coverage. When no cellular coverage exists, the emergency call routing application 335 continues the method 400 to step 430, which will be discussed below. However, with the cellular capability enabled and cellular coverage being provided, the emergency call routing application 335 continues the method 400 to step 425.

In step 425, the emergency call routing application 335 determines that emergency calls that are performed are done over the legacy RAN 210. Since the emergency call is performed over the legacy RAN 210, the location of the client station 205 is known (e.g., based on the cellular network base station that is being used). Accordingly, the emergency call from the client station 205 may be routed to the local PSAP. Specifically, when the client station 205 is located in the home network, the emergency call may be routed to the home PSAP 285 which is the local PSAP. When the client station 205 is located in the remote network, the emergency call may be routed to the remote PSAP 290, which is the local PSAP. Thus, as shown in FIG. 2, the emergency call may originate from the client station 205 having a connection to the legacy RAN 210, forwarded through the cellular core network 230 (specifically the MSC 235, and the GMSC 240) to the other networks 260 (such as the PSTN) to the local PSAP (depending on the location of the client station 205).

Returning to step 410, if the emergency call routing application 335 determines that the client station 205 does not have a cellular capability, the emergency call routing application 335 continues the method 400 to step 430. For example, the wireless communications circuitry 325 may not include cellular capabilities. In a specific example, the client station 205 may be an iPad with WiFi only as manufactured by Apple Inc. in comparison to an iPad with 4G and WiFi capability.

In step 430, the emergency call routing application 335 determines whether the client station 205 has a WiFi capability enabled. It should be noted that since the exemplary embodiments relate to performing an emergency call, it may be assumed that the client station 205 has at least one of a cellular capability, a WiFi capability, or both. That is, the client station 205 does not have both capabilities absent. If the emergency call routing application 335 determines that the client station 205 has the WiFi capability disabled, the emergency call routing application 335 continues the method 400 to step 435. In step 435, the emergency routing application 335 is configured to display instructions to the user via the display device 315 when an emergency call is performed under these circumstances. For example, the instructions under this scenario may indicate that the WiFi capability must be enabled for the emergency call to be performed. The emergency call routing application 335 may continue the method 400 to return to step 405. Specifically, if the WiFi capability has been enabled while all other conditions remain the same, the emergency call routing application 335 continues the method 400 to step 440.

In step 440, the emergency call routing application 235 determines whether the client station 205 has a WiFi calling functionality enabled. As discussed above, the processor 305 may include the call application that enables voice calls to be performed. The voice call may be performed over the legacy RAN 210 or the WiFi network 220. When performed over the WiFi network 220, the call application may include the WiFi calling functionality. If the emergency call routing application 335 determines that the client station 205 has the WiFi calling functionality disabled, the emergency call routing application 335 continues the method 400 to step 435. In step 435, the emergency routing application 335 is configured to display instructions to the user via the display device 315 when the emergency call is performed under these circumstances. For example, the instructions under this scenario may indicate that the WiFi calling functionality must be enabled for the emergency call to be performed. The emergency call routing application 335 continues the method 400 to return to step 405. Specifically, if the WiFi calling functionality has been enabled while all other conditions remain the same, the emergency call routing application 335 continues the method 400 to step 445.

In step 445, the emergency call routing application 335 determines whether the client station 205 has a WiFi association. Specifically, the emergency call routing application 335 of the client station 205 determines whether a connection to the WiFi network 220 has been established. In a substantially similar manner as the legacy RAN 210, the client station 205 may be disposed outside an operating area of the WiFi network 220 such that the WiFi association is absent. If the emergency call routing application 335 determines that the client station 205 has no WiFi association, the emergency call routing application 335 continues the method 400 to step 435. In step 435, the emergency routing application 335 is configured to display instructions to the user via the display device 315 when the emergency call is performed under these circumstances. For example, the instructions under this scenario may indicate that the client station 205 is required to be connected to a WiFi network for the emergency call to be performed. The emergency call routing application 335 continues the method 400 to return to step 405. Specifically, if the WiFi association has been established while all other conditions remain the same, the emergency call routing application 335 continues the method 400 to step 450.

It should be noted that the above examples of the instructions relate to when the emergency call routing application 335 determines that the client station 205 has no cellular capability. However, as discussed above, the emergency call routing application 335 may perform the method 400 to proceed from step 415 and step 420 to step 430. That is, when the airplane mode is enabled (as determined in step 415) such that the cellular capability is disabled or when the cellular capability is enabled with no cellular coverage (as determined in step 420), the emergency call routing application 335 performs the method 400 to continue to step 430. For example, the client station 205 may be an iPhone with 4G and WiFi capability as manufactured by Apple Inc. but either with the airplane mode enabled or out of a cellular coverage of a cellular service provider (e.g., AT&T, T-Mobile, Verizon, etc.).

Thus, returning to step 415, if the emergency call routing application 335 determines that the client station 205 has a cellular capability but has airplane mode enabled, the method 400 continues to step 430. Under these circumstances, when the WiFi capability is determined to be disabled (as determined in step 430), when the WiFi calling functionality is determined to be disabled (as determined in step 440), or when the client station 205 is determined to not have a WiFi association (as determined in step 445), the instructions to be displayed on the display device 315 may be that the user must disable the airplane mode to perform the emergency call. With these instructions, the user may manually change the configurations. Thus, with the method 400 returning to step 405, a different path may be taken for subsequent processing.

Returning to step 420, if the emergency call routing application 335 determines that the client station 205 has a cellular capability and has airplane mode disabled but has no cellular coverage, the emergency call routing application 335 continues the method 400 to step 430. Under these circumstances, when the WiFi capability is determined to be disabled (as determined in step 430), or when the client station 205 is determined to not have a WiFi association (as determined in step 445), the instructions to be displayed on the display device 315 may be that the emergency call cannot be performed over the WiFi network. With these instructions, the user may manually change the configurations or move to a location in which an association to the legacy RAN 210 or the WiFi network 220 may be established. Thus, with the emergency call routing application 335 performing the method 400 is caused to return to step 405, where a different path may be taken for subsequent processing.

When the emergency call routing application 335 determines that cellular service is not an option to perform the emergency call for the client station 205 but that the emergency call may be performed over the WiFi network 220, the emergency call routing application 335 may continue with the method 400. Therefore, returning to step 450, the emergency call routing application 335 may determine whether location information is available. As discussed above, the location information may be determined in a variety of manners such as with out-of-band WiFi crowd-sourced location lookup. If the location information is unavailable, the emergency call routing application 335 continues the method 400 to step 475, which will be discussed below.

When the location information is available, the emergency call routing application 335 continues the method 400 to step 455, where the emergency call routing application 335 provides the location information during a registration procedure with the IMS 265 since the emergency call is being performed over the WiFi network 220. As discussed above, the location information may be included in the P-header by the IMS client when registering with the IMS 265. In step 460, the emergency call routing application 335 determines whether the registration is successful. If unsuccessful, the emergency call routing application 335 continues the method 400 to step 435. In such a scenario, the instructions may indicate that the emergency call cannot be performed over the WiFi network.

Returning to step 460, if the registration is successful, the emergency call routing application 335 continues the method 400 to step 465, where the emergency call routing application 335 verifies the registration with the location information with the WiFi network. For example, a 200 OK response may be received for the verification. In another example, the location information may be referenced as to whether the PECR functionality is possible. That is, the emergency call routing application 335 may determine or request whether a pathway may be established to the local PSAP based upon the location information. As discussed above, this may be performed by the E-CSCF 280 of the IMS 265. If the verification fails, the emergency call routing application 335 continues the method 400 to step 475, which will be discussed below. If the registration with the location information is successful and verified, the emergency call routing application 335 continues the method 400 to step 470, where the emergency call may be performed using the WiFi network 220. For example, a packet-switched emergency call may be performed by the client station 205 over the WiFi network 220. Specifically, when the emergency call is performed over the WiFi network 220, the local PSAP may have the emergency call routed thereto from the client station 205. Thus, as shown in FIG. 2, the emergency call may originate from the client station 205 having a connection to the WiFi network 220, forwarded through other networks 225 (e.g., an ISP), forwarded through the cellular core network 230 (specifically the ePDG 255 and the PDNGW 250) to the IMS 265 (specifically the E-CSCF 280) to the other networks 260 (e.g., the PSTN) to the local PSAP (depending on the location of the client station 205).

Returning to step 450 where the location information is unavailable, the emergency call routing application 335 continues the method 400 to step 475. Also, returning to step 465 where the verification fails, the emergency call routing application 335 continues the method 400 to step 475. In step 475, the civic address is used to register with the IMS 265. The civic address may correspond to the home network of the client station 205. Thus, the civic address that is used to register with the IMS 265 may be within the area of the home network. When the client station 205 is located within the area of the home network, the location used for registration is the civic address which (in this case) may also be considered as the location of the client station 205 (although unaware by all network components). When the client station 205 is located within the area of the remote network, the location used for registration is the civic address, which is not the location of the client station 205. It should be noted that the user may consent to providing the civic address and therefore be an option that the user of the client station 205 agrees to enabling. However, if disabled, the civic address may not be used during the registration procedure to the IMS 265.

In step 480, the emergency call routing application 335 determines whether the registration with the civic address is successful. If unsuccessful, the emergency call routing application 335 continues the method 400 to step 435 in which instructions are shown on the display device 315. In such a scenario, the instructions may indicate that the emergency call cannot be performed over the WiFi network 220. However, if the registration with the civic address is successful, the emergency call routing application 335 continues the method 400 to step 485.

In step 485, the emergency call routing application 335 determines again whether the client station 205 is cellular capable. This second determination may indicate whether the pathway through the method 400 relates to whether the airplane mode is enabled and/or cellular coverage is available versus when the cellular capability is absent. If the client station 205 does not have a cellular capability, the emergency call routing application 335 continues the method 400 to step 470, where the emergency call may be performed over the WiFi network 220. However, in contrast to registering with the location information, the use of the civic address causes the emergency call to be routed to the home PSAP instead of the local PSAP. For example, with the client station 205 in the area of the remote network, under these circumstances, an emergency call that is performed by the client station 205 is routed to the home PSAP 285 although preferred to be routed to the remote PSAP 290 (which would be local to the client station 205).

Returning to step 485, if the client station 205 is cellular capable, the emergency call routing application 335 continues the method 400 to step 490. In step 490, the emergency call routing application 335 performs a cellular option such that the location of the client station 105 may still be utilized prior to using the civic address for emergency calls. The cellular option will be described in further detail below with regard to FIG. 5. If the cellular option is successful, then the emergency call routing application 335 continues the method 400 to step 425 in which the emergency call is performed over the legacy RAN 210. As discussed above, the use of the legacy RAN 210 may enable the emergency call to be routed to the local PSAP. However, if the cellular option fails, the fallback position of using the WiFi network 220 to perform the emergency call in which the emergency call is routed to the home PSAP is performed.

Figure 5:
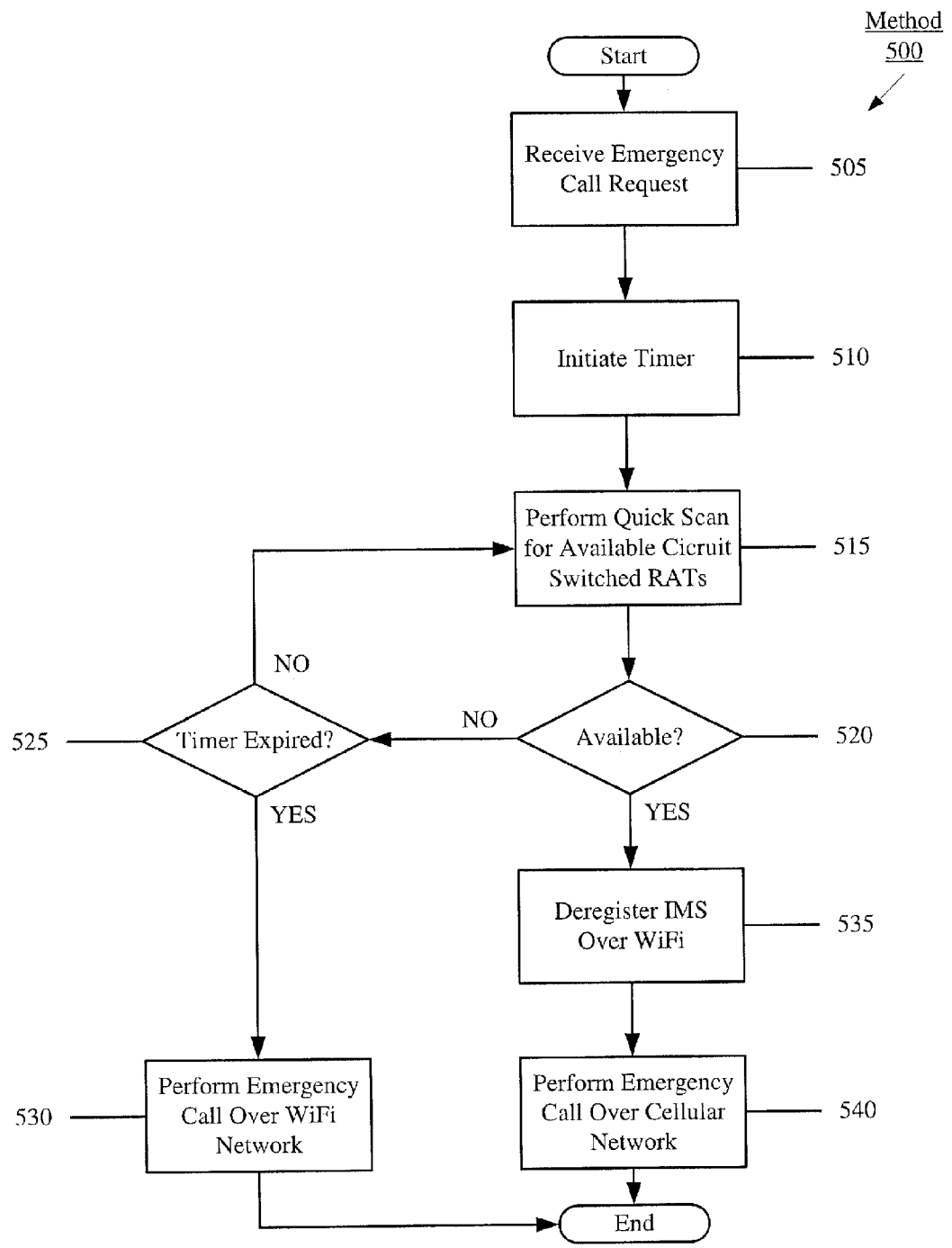
FIG. 5 shows an exemplary method for performing a cellular option.

FIG. 5 shows an exemplary method 500 for performing a cellular option by the client station 205. In the method 500 of FIG. 5, the client station 205 is initially determined to have a cellular capability disabled and has a civic address that is used for registering with the IMS 265 when connected to the WiFi network 220. For example, the client station 205 may be determined to have no cellular service and is registered to the IMS 265 using its civic address. Accordingly, the emergency call would be routed to the home PSAP 285 instead of the remote PSAP 290 when located in the area of the remote network. Specifically, the cellular option of the method 500 performed by the client station 205 corresponds to step 490 of the method 400 of FIG. 4. More specifically, the cellular option relates to when an emergency call is actively being performed.

In step 505, the emergency call routing application 335 receives the request for an emergency call. For example, a user of the client station 205 may enter the emergency telephone number on the I/O device 320 (e.g., 911). In step 510, the emergency call routing application 335 initiates a timer.

In step 515, the emergency call routing application 335 signals for a quick scan to be performed to determine available circuit switched RATS. Since the cellular capability has already been determined to be available but that the cellular service is not, this may provide a subsequent determination of whether cellular service may be established (e.g., between the client station 205 and the legacy RAN 210). If no available legacy RAN 210 is found in step 520, the emergency call routing application 335 continues the method 500 to step 525, where the emergency call routing application 335 determines whether the timer expired. If still running, the emergency call routing application 335 continues the method 500 to return to step 515. However, if the timer expired, the emergency call routing application 335 continues the method 500 to step 530, where the emergency call is performed over the WiFi network 220 and the civic address is still used as the basis for routing the emergency call. This step may correspond to step 470 of the method 400 of FIG. 4. Accordingly, the emergency call performed over the WiFi network 220 by the client station 205 located in the area of the remote network results in a routing to the home PSAP 285.

Returning to step 520, if a circuit switched radio access technology (RAT) is found to be available, the emergency call routing application 335 continues the method 500 to step 535, where the emergency call routing application 335 signals for the IMS 265 to be de-registered. Specifically, by using the legacy RAN 210 and the cellular core network 230, the IMS 265 is not required. Furthermore, the connection to the legacy RAN 210 may be established. Thus, in step 540, the emergency call may be performed over the legacy RAN 210 in which the location information of the client station 205 is used as the basis for routing the emergency call. That is, the emergency call performed by the client station 205 over the legacy RAN 210 results in a routing to the local PSAP. This step may correspond to step 425 of the method 400 of FIG. 4.

It should be noted that the above manner in which the emergency call routing application 335 performing the cellular option of the method 500 is only exemplary. For example, the use of the timer in step 510 is only exemplary and may not be included in the method 500. However, further manners may be used by the emergency call routing application 335 to determine how the method 500 is to be performed such that it proceeds from step 525 to step 530.

The exemplary embodiments provide a system and method for performing an emergency call and utilize location information of a station to route the emergency call. Specifically, the emergency call is routed to a local PSAP relative to the station. When the emergency call is performed over a legacy RAN, it may be routed to the local PSAP as location information is known. When the emergency call is performed over a WiFi network, the exemplary embodiments provide a mechanism to include the location information during a registration thereto such that an emergency call may be routed to the local PSAP instead of a home PSAP associated with a home network of the station that may potentially be located farther away than the local PSAP.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
at a client station:
determining that a first connection to a cellular network is unavailable, the client station being associated with a home network, the home network having a home Public-Safety Answering Point (PSAP) associated therewith, the client station disposed at a geographic location outside the home network, the geographic location having a remote PSAP associated therewith;
determining that a second connection to a WiFi network is available;
establishing the second connection to the WiFi network; and
performing an emergency call over the WiFi network by registering with an Internet Protocol (IP) Multimedia Subsystem (IMS), the registering including providing location information of the client station, the emergency call being routed to the remote PSAP associated with the geographic location corresponding to the location information.

2. The method of claim 1, further comprising:
determining that the location information of the client station is unavailable; and
determining that the registering with the location information is unsuccessful.

3. The method of claim 2, further comprising:
registering with the IMS by providing civic address information of the client station, the emergency call being routed to the home PSAP when one of the location information is unavailable or the registering is unsuccessful.

4. The method of claim 3, further comprising:
determining, after registering with the IMS by providing civic address information, whether the first connection to the cellular network is available; and
performing the emergency call over the cellular network.

5. The method of claim 4, wherein performing the emergency call over the cellular network includes:
determining whether a circuit switched radio access technology (CS-RAT) is available; and
deregistering from the IMS via the second connection when it is determined that the CS-RAT is available.

6. The method of claim 5, wherein performing the emergency call over the cellular network further includes:
initiating a timer, wherein the CS-RAT is determined to be available prior to the timer expiring.

7. The method of claim 1, wherein the first connection is determined to be unavailable based on one of the client station not having a cellular capability, the cellular capability of the client station being disabled or the client station being outside a range of cellular coverage.

8. The method of claim 1, wherein the location information is determined from one of out-of-band crowd-sourced WiFi location information, a global positioning system (GPS) location, a satellite based location system, or a triangulation based location system.

9. The method of claim 1, further comprising:
displaying an indication to a user of the client station when the first and second connections are unavailable.

10. A client station, comprising:
wireless communications circuitry configured to establish a connection to at least one of a cellular network and a WiFi network; and
a processor;
wherein the processor and the wireless communications circuitry are configured to perform an emergency call by:
determining that a first connection to the cellular network is unavailable, the client station being associated with a home network, the home network having a home Public-Safety Answering Point (PSAP) associated therewith, the client station disposed at a geographic location outside the home network, the geographic location having a remote PSAP associated therewith;
determining that a second connection to the WiFi network is available;
establishing the second connection to the WiFi network; and
performing an emergency call over the WiFi network by registering with an Internet Protocol (IP) Multimedia Subsystem (IMS), the registering including providing location information of the client station, the emergency call being routed to the remote PSAP associated with the geographic location corresponding to the location information.

11. The client station of claim 10, wherein the processor and the wireless communications circuitry is further configured to perform an emergency call by:
determining that the location information of the client station is unavailable; and
determining that the registering with the location information is unsuccessful.

12. The client station of claim 11, wherein the processor and the wireless communications circuitry is further configured to perform an emergency call by:
registering with the IMS by providing civic address information of the client station, the emergency call being routed to the home PSAP when one of the location information is unavailable or the registering is unsuccessful.

13. The client station of claim 12, wherein the processor and the wireless communications circuitry is further configured to perform an emergency call by:
determining, after registering with the IMS by providing civic address information, whether the first connection to the cellular network is available; and
performing the emergency call over the cellular network.

14. The client station of claim 10, wherein the first connection is determined to be unavailable based on one of the client station not having a cellular capability, the cellular capability of the client station being disabled or the client station being outside a range of cellular coverage.

15. The client station of claim 10, wherein the location information is determined from one of out-of-band crowd-sourced WiFi location information, a global positioning system (GPS) location, a satellite based location system, or a triangulation based location system.

16. A method, comprising:
at a client station:
determining the client station is capable of performing an emergency call over a cellular network;
receiving a request to perform an emergency call;
determining whether a circuit switched radio access technology (CS-RAT) of the cellular network is available; and
performing the emergency call over a WiFi network when the CS-RAT is unavailable, wherein the emergency call is routed to one of a home Public-Safety Answering Point (PSAP) associated with the client station or a remote PSAP associated with a geographic location where the client station is currently located.

17. The method of claim 16, further comprising: performing the emergency call over the cellular network when the CS-RAT is available.

18. The method of claim 17, wherein the client station is registered with an Internet Protocol (IP) Multimedia Subsystem (IMS), and the performing the emergency call over the cellular network further comprises:
deregistering from the IMS.

19. The method of claim 16, further comprising:
initiating a timer, wherein the emergency call is performed over the WiFi network when it is determined that the CS-RAT is not available prior to the timer expiring.

20. The method of claim 16, further comprising:
registering the client station with an Internet Protocol (IP) Multimedia Subsystem (IMS) including one of the geographic location where the client station is currently located or a civic address associated with the client station,
wherein the emergency call is routed to the remote PSAP when the registering includes the geographic location where the client station is currently located and the home PSAP when the registering includes the civic address.

* * * * *